Aug. 18, 1970   D. C. BROWN   3,524,226
FASTENER
Filed Oct. 9, 1968
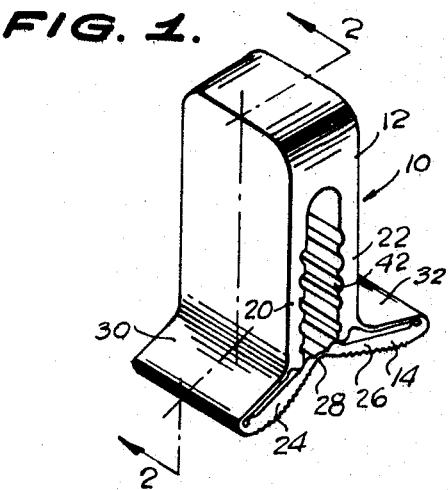
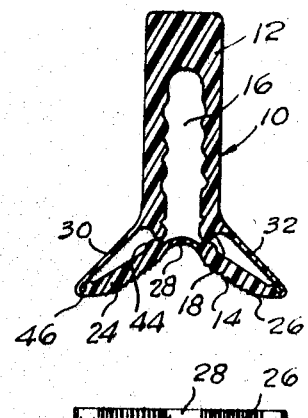
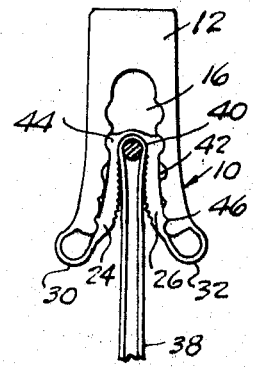
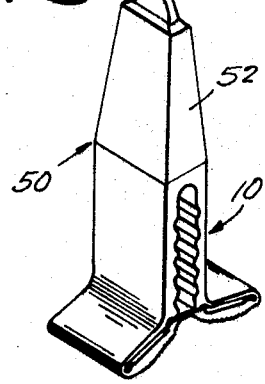
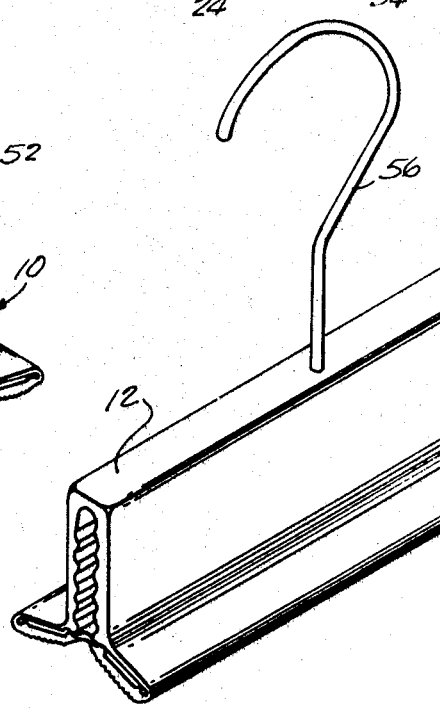
INVENTOR.
DWIGHT C. BROWN,
BY
Drufsky and Staas.
ATTORNEYS.

United States Patent Office 3,524,226
Patented Aug. 18, 1970

3,524,226
FASTENER
Dwight C. Brown, 414 N. Granada St.,
Arlington, Va. 22203
Filed Oct. 9, 1968, Ser. No. 766,120
Int. Cl. D06f 55/00
U.S. Cl. 24—84          10 Claims

ABSTRACT OF THE DISCLOSURE

A fastener comprising an integral upper and lower part. The upper part is resilient and has a channel opening along its bottom surface. The lower part is collapsible and insertable into the channel of the upper part. The lower part consists of a pair of normally, downwardly diverging jaws, pivotally joined to each other adjacent their upper edges and having lower edges hinged to opposite sides of the upper part. The jaws have a combined width approximately equal to the width of the channel. The jaws are placed in surrounding relation to an article to be clamped, and the structure moved downwardly. The jaws will collapse towards each other and recede into the channel of the upper part firmly clamping the article therebetween.

---

This invention generally relates to a fastener and more particularly, to a fastener for use as a clip, clothespin, garment hanger, or the like.

Heretofore fasteners of this type were either made from a plurality of components including separate gripping jaws biased towards each other by a spring for gripping an article therebetween or were of a rigid, one-piece construction having a channel whose side walls formed gripping jaws for frictionally engaging an article. The former are expensive to manufacture while the latter could not be used to grip articles having a wide range of varying thicknesses.

The fastener of this invention eliminates the disadvantages of these prior art devices. The fastener comprises a one-piece, endless, molded plastic unit having a relatively rigid, but resilient upper portion provided with an elongated channel opening along its bottom surface. A collapsible lower part comprising normally downwardly diverging gripping jaws pivotally connected at their upper edges is hinged to opposite sides of the upper part. In their closed position, the combined width of the jaws is approximately equal to the width of the channel. The jaws are disposed about an article to be clamped and downward movement of the fastener will cause the jaws to recede into the channel of the upper part, which will spread the resilient legs of the channel. The jaws will collapse towards each other to firmly grip the article therebetween under the urging of the spread channel legs. Depending upon the resiliency of the upper part, the fastener can be adapted to clamp articles having a wide range of thicknesses. When the fastener is removed from clamping relation with the article, the upper part will move relative to the jaws, and the jaws will drop out of the channel into their normally downwardly divergent open position, facilitating reuse by simple downward thrust over a new article.

Accordingly, it is an object of this invention to provide a fastener to effect positive securement of articles of varying thicknesses.

A further object of this invention is to provide a fastener which lends itself to an endless, one-piece construction, thereby enabling it to be mass produced by molding a long strip which can be cut into individual pieces.

Further objects and advantages of this invention will become apparent from the following description and claims, and from the accompanying drawing, wherein:

FIG. 1 is a perspective view of the fastener of the present invention;

FIG. 2 is a cross-sectional view taken substantially along the plane indicated by line 2—2 of FIG. 1;

FIG. 3 is a bottom plan view of the fastener shown in FIG. 1;

FIG. 4 is an end view in elevation of the fastener shown in FIG. 1, and further illustrating its use as a clothespin;

FIG. 5 is a perspective view of a slightly modified form of the fastener, which can be used to hang clamped articles; and FIG. 6 is a perspective view of another modified form of the fastener, which can be used as a shirt or trouser hanger.

DETAILED DESCRIPTION OF THE INVENTION

Referring now to the drawing in detail, wherein like numerals indicate like elements throughout the several views, the fastener of the present invention is generally designated by the numeral 10.

Fastener 10 comprises a one-piece, endless, molded plastic unit including a relatively rigid upper part 12 and a collapsible lower part 14.

Upper part 12 is generally U-shaped in cross-section and has a narrow, elongated channel 16 cut along its longitudinal axis and opening in its bottom surface 18. Legs 20, 22 of upper part 12 are resilient.

Lower part 14 includes a pair of normally, downwardly divergent gripping jaws 24, 26, pivotally connected along their upper edges by a flexible hinge 28 of reduced thickness. Lower edges of jaws 24, 26 are connected by flexible hinges 30, 32, respectively, to opposite portions of the legs 20, 22 of upper part 12. Flexible hinges 30, 32 are also formed by reducing the thickness of the molded plastic.

The bottom surface 34 of each jaw 24, 26 is roughened to increase its frictional holding power. This roughening may take the form of serrations 36 cut in surfaces 34.

With particular reference to FIGS. 2 and 4, the use of fastener 10 as a clothespin is illustrated. In FIG. 2, jaws 24, 26 are normally in an open downwardly divergent position ready for use. In this position the combined width of jaws 24, 26 is greater than the width of channel 16.

Fastener 10 in its open position is disposed about an article 38 hanging from clothesline 40 and moved downwardly. As jaws 24, 26 contact the article 38, they will pivotally collapse towards each other about hinge 28 and recede into channel 16. Preferably, the combined thickness of jaws 24, 26 should be approximately equal to the width of channel 16 so that the combined thickness of article 38, clothesline 40, and jaws 24, 26 will be greater than the width of channel 16, as illustrated by example in FIG. 4. The legs 20, 22 of upper part 12, being resilient, will spread as jaws 24, 26 recede into channel 16, and push back on the jaws to clamp article 38 therebetween. The amount of movement of jaws 24, 26 into channel 16 will depend upon the inherent resiliency of legs 20, 22, and the combined thickness of article 38 and clothesline 40, which will determine the point at which the jaws will frictionally bind on the side walls of the channel. However, the effect of jaws 24, 26 is to provide a positive force to spread the legs 20, 22 of upper part 12 and to bridge channel 16 to accommodate it to grip articles of varying thicknesses.

Horizontal notches 42 can also be provided in the side walls of channel 16 to aid in the frictional engagement of the jaws. Notches 42 are adapted to receive horizontal ribs 44 and 46 on each jaw, complemental in shape to notches 42. The cooperation between notches 42 and ribs 44, 46 positively lock the jaws in channel 16 and preclude their slippage to an open position.

If upper part 12 is grasped and moved upwardly from its position in FIG. 4, it will move relative to lower part 14, allowing the lower part 14 to drop out of channel 16 to its open position illustrated in FIG. 2, releasing article 38.

FIG. 5 illustrates that fastener 10 may also be used as a portion of a hanger clip 50. Fastener 10 is secured to an extension block 52 by conventional fastening means. Block 52 can have an integral hook 54 extending upwardly from its top surface. Alternatively, fastener 10, block 52, and hook 54 can be molded as an integral unit.

FIG. 6 illustrates that fastener 10 may be elongated and used as a pants or skirt hanger by merely securing a hook 56 to upper part 12 in any conventional manner.

Because fastener 10 is of an endless, one-piece construction comprising upper part 12, hinge 32, jaw 26, hinge 28, jaw 24, and hinge 30, it can be molded in strip form and cut into individual fastening pieces of various widths. This enables it to be readily mass produced at a minimum expense.

What is claimed is:

1. A fastener comprising a resilient upper portion having an elongated channel opening along a bottom surface thereof, and a connected collapsible lower portion, said lower portion including a pair of vertically movable clamping jaws pivotally connected adjacent their upper edges and of a dimension to be received within said channel in frictional engagement with the opposite side walls thereof when in clamping engagement with an article disposed therebetween.

2. A fastener in accordance with claim 1 including hinge means for pivotally connecting the lower edge of each of said jaws to opposite sides of said upper portion.

3. A fastener in accordance with claim 1 wherein said clamping jaws are received within said channel in frictional engagement substantially throughout their length disposed within said channel with the opposite side walls thereof when in clamping engagement with an article disposed therebetween.

4. A fastener comprising a resilient upper portion having an elongated channel opening along the bottom surface thereof and a collapsible lower portion, said lower portion including a pair of clamping jaws pivotally connected adjacent their upper edges and of a dimension to be received within said channel in frictional engagement with the side walls thereof when in clamping engagement with an article disposed therebetween, said jaws being normally downwardly diverging and in said condition of a greater width than said channel, hinge means for pivotally connecting the lower edge of each of said jaws to opposite sides of said upper portion, said hinge means including a flexible hinge connecting the lower edge of each of said jaws to opposite sides of said upper portion, whereby said jaws can be disposed about an article and moved into said channel, pivotally collapsing towards each other to clamp about said article disposed therebetween.

5. A fastener in accordance with claim 4 wherein said upper portion, lower portion, and flexible hinges comprise an endless, one-piece construction.

6. A fastener in accordance with claim 5 wherein said locking means includes a plurality of vertically spaced notches on the side walls of said channel and ribs on the top surfaces of said jaws adapted to be complementally seated within selected notches.

7. A fastener in accordance with claim 6 wherein the bottom surface of said jaws is roughened to increase frictional engagement with said article.

8. A fastener in accordance with claim 7 wherein said upper portion, lower portion, and flexible hinges comprise an endless, one-piece construction.

9. A fastener in accordance with claim 8 wherein said upper portion includes a vertically extending hook.

10. A fastener in accordance with claim 4 including means between the side walls of each channel and said jaws for locking said jaws to the side walls of said channel.

References Cited

UNITED STATES PATENTS 3,137,027 6/1964 Birkle.
3,292,223 12/1966 Esposito _____ 24—137

FOREIGN PATENTS 138,687 9/1950 Australia.
1,212,998 10/1959 France.

DONALD A. GRIFFIN, Primary Examiner

U.S. Cl. X.R.

24—137